(12) United States Patent
Mino et al.

(10) Patent No.: US 6,815,096 B2
(45) Date of Patent: Nov. 9, 2004

(54) SOFT MAGNETIC THIN FILM AND THIN FILM MAGNETIC HEAD USING THE SAME

(75) Inventors: Tetsuya Mino, Tokyo (JP); Seiji Yari, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 10/139,377

(22) Filed: May 7, 2002

(65) Prior Publication Data
US 2003/0003325 A1 Jan. 2, 2003

(30) Foreign Application Priority Data

| May 16, 2001 | (JP) | ........................................ 2001-146087 |
| May 16, 2001 | (JP) | ........................................ 2001-146088 |
| Jun. 5, 2001 | (JP) | ........................................ 2001-169396 |

(51) Int. Cl.⁷ .............................. G11B 5/31; C22C 38/10
(52) U.S. Cl. ................. 428/692; 428/702; 252/62.51 R
(58) Field of Search ................... 252/62.51 R; 428/692, 428/702, 900; 148/306, 307, 311

(56) References Cited

U.S. PATENT DOCUMENTS

| 5,062,909 A | * | 11/1991 | Ramanan et al. ............ 148/304 |
| 5,133,814 A | * | 7/1992 | Matsuyama et al. ......... 148/305 |
| 5,227,193 A | * | 7/1993 | Hori et al. ................... 427/131 |
| 5,290,629 A | * | 3/1994 | Kobayashi et al. ......... 428/65.7 |
| 5,302,469 A | * | 4/1994 | Sugenoya et al. ........ 428/694 T |
| 5,478,416 A | * | 12/1995 | Takaoka et al. ............. 148/306 |
| 5,522,946 A | * | 6/1996 | Tomita et al. ............... 148/304 |
| 5,736,264 A | * | 4/1998 | Ishiwata et al. ......... 428/694 R |
| 5,750,273 A | | 5/1998 | Inoue et al. |
| 5,833,770 A | * | 11/1998 | Ominato et al. ............. 148/305 |
| 6,118,628 A | * | 9/2000 | Sano et al. .................. 360/126 |
| 6,171,716 B1 | * | 1/2001 | Sasaki et al. ................ 428/692 |
| 6,231,968 B1 | * | 5/2001 | Hiramoto et al. ........... 428/332 |

FOREIGN PATENT DOCUMENTS

JP            05-148595           6/1993

OTHER PUBLICATIONS

English Translation of JP 05–148595–A (PTO 04–2913).*
Machine Translation of JP 05–148595 A.*

* cited by examiner

Primary Examiner—Kevin M. Bernatz
(74) Attorney, Agent, or Firm—Oblon, Spivak, McClelland, Maier & Neustadt, P.C.

(57) ABSTRACT

There is disclosed a soft magnetic thin film represented by a composition formula of $Fe_{a1} \cdot Co_{b1} \cdot C_{c1} \cdot O_{d1}$. In this case, atomic % values of the a1 to d1 respectively satisfy the following:

$51.0 \leq a1 \leq 95.0$, $50 \leq b1 \leq 49.0$, $0.5 \leq c1 \leq 10.0$, $0.5 \leq d1 \leq 20.0$, $a1+b1+c1+d1=100$ Thus, it is possible to improve a characteristic of a thin film magnetic head by achieving a high saturation magnetic flux density, suppressing an increase in an anisotropic magnetic field caused by increased concentration of oxygen, and preventing a reduction in permeability.

6 Claims, 1 Drawing Sheet

FIG.1

SOFT MAGNETIC THIN FILM AND THIN FILM MAGNETIC HEAD USING THE SAME

BACKGROUND OF THE INVENTION

1. Field of the Invention

A first group of the present invention relates to a soft magnetic thin film, and a thin film magnetic head using the same. More particularly, it relates to a soft magnetic thin film having a high saturation magnetic flux density, and capable of preventing a reduction in permeability by suppressing an increase of an anisotropic magnetic field, and improving a characteristic of a thin film magnetic head.

A second group of the present invention relates to a soft magnetic thin film, and a thin film magnetic head using the same. More particularly, it relates to a soft magnetic thin film having a high saturation magnetic flux density and a small coercive force, and capable of preventing a reduction in permeability by suppressing an increase of an anisotropic magnetic field, and improving a characteristic of a thin film magnetic head.

A third group of the present invention relates to a soft magnetic thin film, and a thin film magnetic head using the same. More particularly, it relates to a soft magnetic thin film capable of setting a value of a saturation magnetic flux density and a resistance value both at high levels in a well-balanced manner, and a thin film magnetic head using the same.

2. Description of the Related Art (1) With a higher recording density of writing on a hard disk recording medium achieved in recent years, progresses have been made in achievements of applying a magnetic head to a narrower track and a higher coercive force of the medium for writing. In a writing head of such a high recording density, in order to generate a sufficient magnetic flux, a material having a saturation magnetic flux density higher than that of permalloy conventionally used for a writing magnetic pole must be used.

An example in the related art that can meet the above-described need is a soft magnetic alloy thin film disclosed in Japanese Patent Application Laid-Open Heisei 5 (1993)-148595. This soft magnetic alloy thin film having a composition of Fe—Co—M—O (M is at least an element selected from Zr and Hf, or a mixture thereof) was developed to have a high saturation magnetic flux density, and thermal stability. According to this disclosed thin film, a high saturation magnetic flux density of about 21.0 kG at a maximum is obtained.

However, in the thin film of Fe—Co containing oxygen, an increase occurs in an anisotropic magnetic field following increased concentration of oxygen in the film, consequently causing a reduction in permeability of the film.

In order to provide a magnetic film having uniaxial magnetic anisotropy of a proper energy, high electric resistance and saturation magnetization, and a good high-frequency characteristic of permeability, Japanese Patent Application Laid-Open Heisei 5(1996)-273930 discloses an idea of adding various elements to the soft magnetic thin film of Fe—Co. Indication is made therein of a possibility of widely containing carbon and oxygen. The disclosed film contains M (at least one selected from Zr, Hf, Nb and Y) as an essential element, and preferable combinations of the elements are described to be a combination of Zr and Si, a combination of Zr and Ge, a combination of Zr and Sn, and a combination of Hf and Si. However, an actually disclosed embodiment sample is only a combination of Zr and Si, and no specific advantages of the contained carbon and oxygen is not made explicit substantially.

(2) As described above, with a higher recording density of writing on a hard disk recording medium achieved in recent years, progresses have been made in achievements of applying a magnetic head to a narrower track and a higher coercive force of the medium for writing.

In a writing head of such a high recording density, in order to generate a sufficient magnetic flux, a material having a saturation magnetic flux density higher than that of permalloy conventionally used for a writing magnetic pole must be used.

An example in the related art that can meet the above-described need is a soft magnetic alloy thin film disclosed in Japanese Patent Application Laid-Open Heisei 5 (1993)-148595. This soft magnetic alloy thin film having a composition of Fe—Co—M—O or Fe—Co—M—O—X (M is at least an element selected from the group consisting of Zr and Hf, or a mixture thereof; and X is at least an element selected from the group consisting of Y, Al, Si and B, or a mixture thereof) was developed to have a high saturation magnetic flux density, and thermal stability. According to this disclosed thin film, a high saturation magnetic flux density of about 21.0 kG at a maximum is obtained.

However, in the thin film of Fe—Co containing oxygen, an increase occurs in an anisotropic magnetic field following increased concentration of oxygen in the film, consequently causing a reduction in permeability of the film.

An example in the related art that may have a relation to the present invention is a soft magnetic alloy disclosed in Japanese Patent Application Heisei 10 (1998)-25530. This soft magnetic alloy, a specific embodiment thereof having a composition of $(Co_{0.72}Fe_{0.28})_{59}Hf_{16}O_{20}C_5$, was developed to have high specific resistance and permeability in a high-frequency band as a high-frequency magnetic material. Because of a rich content of Co, however, this material has an inconvenience of a low saturation magnetic flux density compared with that of a rich content of Fe.

In order to provide a magnetic film having uniaxial magnetic anisotropy of a proper energy, high electric resistance and saturation magnetization, and a good high-frequency characteristic of permeability, Japanese Patent Application Laid-Open Heisei 8 (1996)-273930 discloses an idea of adding various elements to the soft magnetic thin film of Fe—Co. Indication is made therein of a possibility of widely containing carbon and oxygen. The disclosed film contains M (at least one selected from Zr, Hf, Nb and Y) as an essential element, and preferable combinations of the elements are described to be a combination of Zr and Si, a combination of Zr and Ge, a combination of Zr and Sn, and a combination of Hf and Si. However, an actually disclosed embodiment sample is only a combination of Zr and Si, and no specific advantages of the contained carbon and oxygen is not made explicit substantially.

(3) As described above, with a higher recording density of writing on a hard disk recording medium achieved in recent years, progresses have been made in achievements of applying a magnetic head to a narrower track and a higher coercive force of the medium for writing. In a writing head of such a high recording density, in order to generate a sufficient magnetic flux, a material having a saturation magnetic flux density higher than that of permalloy conventionally used for a writing magnetic pole must be used.

An example in the related art that can meet the above-described need is a soft magnetic alloy thin film disclosed in Japanese Patent Application Laid-Open Heisei 5 (1993)-148595. This soft magnetic alloy thin film having a composition of Fe—Co—M—O or Fe—Co—M—O—X (M is at least an element selected from the group consisting of Zr and Hf, or a mixture thereof; and X is at least an element selected from the group consisting of Y, Al, Si and B, or a mixture thereof) was developed to have a high saturation magnetic flux density, and thermal stability. According to this disclosed thin film, a high saturation magnetic flux density of about 21.0 kG at a maximum is reportedly obtained.

Considering a development of a next-generation head, however, there is no limit to requests for a higher saturation magnetic flux density of a soft magnetic thin film. On the other hand, a value of specific resistance tends to be lowered more as a saturation magnetic flux density is increased more. Therefore, a new thin film composition must be designed, which can secure a desired value of specific resistance, and simultaneously obtain a high saturation magnetic flux density. In other words, it is necessary to design a thin film composition capable of obtaining a desired value of specific resistance while maintaining a value of a saturation magnetic flux density at a high level without any reductions.

SUMMARY OF THE INVENTION

The present invention has been made to solve the foregoing conventional problems (1) to (3).

That is, the first group of the present invention is directed to the conventional problem (1), and an object thereof is to solve the problem (1) and provide a soft magnetic thin film having a high saturation magnetic flux density, and capable of preventing a reduction in permeability by suppressing an increase of an anisotropic magnetic field following increased concentration of oxygen, and improving a characteristic of a thin film magnetic head.

In order to achieve the object, the present invention provides a soft magnetic thin film represented by a composition formula of $Fe_{a1} \cdot Co_{b1} \cdot C_{c1} \cdot O_{d1}$. In this case, atomic % values of the a1 to d1 respectively satisfy the following:

$51.0 \leq a1 \leq 95.0$, $5.0 \leq b1 \leq 49.0$ $0.5 \leq c1 \leq 10.0$ $0.5 \leq d1 \leq 20.0$ $a1+b1+c1+d1=100$ The present invention also provides a thin film magnetic head comprising: a magnetic core made of a soft magnetic thin film for forming a loop magnetic circuit; and a magnetic gap formed in a part of the loop magnetic circuit. In this case, the entire or partial soft magnetic thin film of the magnetic core is represented by a composition formula of $Fe_{a1} \cdot Co_{b1} \cdot C_{c1} \cdot O_{d1}$, and atomic % values of the a1 to d1 respectively satisfy the following:

$51.0 \leq a1 \leq 95.0$, $5.0 \leq b1 \leq 49.0$ $0.5 \leq c1 \leq 10.0$ $0.5 \leq d1 \leq 20.0$ $a1+b1+c1+d1=100$ The second group of the present invention is directed to the conventional problem (2), and an object thereof is to solve the problem (2) and provide a soft magnetic thin film having a high saturation magnetic flux density and a small coercive force, and capable of preventing a reduction in permeability by suppressing an increase of an anisotropic magnetic field following increased concentration of oxygen, and improving a characteristic of a thin film magnetic head.

In order to achieve the object, the present invention provides a soft magnetic thin film represented by a composition formula of $Fe_{a2} \cdot Co_{b2} \cdot M2_{c2} \cdot C_{d2} \cdot O_{e2}$. In this case, the M2 is at least one selected from the group consisting of Ti, V, Ta, Nb, Cr, Mo, W, Cu, Zn, Ga, Al, Zr, Y, Si and B, and atomic % values of the a2 to e2 respectively satisfy the following:

$51.0 \leq a2 \leq 95.0$, $5.0 \leq b2 \leq 49.0$, $0.5 \leq c2 \leq 15.0$, $0.5 \leq d2 \leq 10.0$, $0.5 \leq e2 \leq 20.0$ $a+2+b2+c2+d2+e2=100$ According to the soft magnetic thin film of the present invention, preferably, the M2 is at least one selected from the group consisting of Zr, Ti, Ta, Nb and Cr.

According to the soft magnetic thin film of the present invention, preferably, the d2 as a carbon content is set to $0.55 \leq d2 \leq 7.0$.

The present invention also provides a thin film magnetic head comprising: a magnetic core made of a soft magnetic thin film for forming a loop magnetic circuit; and a magnetic gap formed in a part of the loop magnetic circuit. In this case, the entire or partial soft magnetic thin film of the magnetic core is represented by a composition formula of $Fe_{a2} \cdot Co_{b2} \cdot M2_{c2} \cdot C_{d2} \cdot O_{e2}$, the M2 is at least one selected from the group consisting of Ti, V, Ta, Nb, Cr, Mo, W, Cu, Zn, Ga, Al, Zr, Y, Si and B, and atomic % values of the a2 to e2 respectively satisfy the following:

$51.0 \leq a2 \leq 95.0$, $5.0 \leq b2 \leq 49.0$, $0.5 \leq c2 \leq 15.0$, $0.5 \leq d2 \leq 10.0$, $0.5 \leq e2 \leq 20.0$ $a2+b2+c2+d2+e2 \leq 100$ The third group of the present invention is directed to the conventional problem (3), and objects thereof are to solve the problem (3), and provide a soft magnetic thin film capable of setting a value of a saturation magnetic flux density and a specific resistance value both at high levels in a well-balanced manner, and a thin film magnetic head using the same.

In order to achieve the objects, the present invention provides a soft magnetic thin film represented by a composition formula of $Fe_{a3} \cdot Co_{b3} \cdot M3_{c3} \cdot O_{d3}$. In this case, the M3 is at least one selected from the group consisting of Ti, V, Ta, Nb, Cr, Mo and W, and atomic % values of the a3 to d3 respectively satisfy the following:

$51.0 \leq a3 \leq 95.0$, $5.0 \leq b3 \leq 49.0$, $0.5 \leq c3 \leq 15.0$, $0.5 \leq d3 \leq 20.0$, $a3+b3+c3+d3=100$ According to the soft magnetic thin film of the present invention, preferably, the M3 is one selected from the group consisting of Ta and Ti.

According to the soft magnetic thin film of the present invention, preferably, ranges of the c3 and d3 in the composition formula of $Fe_{a3} \cdot Co_{b3} \cdot M3_{c3} \cdot O_{d3}$ are respectively set to the following:

$0.5 \leq c3 \leq 2.0$.

$0.5 \leq d3 \leq 8.0$

According to the soft magnetic thin film of the present invention, preferably, ranges of c3 and d3 in the composition formula of $Fe_{a3} \cdot Co_{b3} \cdot M3_{d3} \cdot O_{d3}$ are respectively set to the following:

$2.1 \leq c3 \leq 4.0$, $9.0 \leq d3 \leq 18.0$

The present invention also provides a thin film magnetic head comprising: a magnetic core made of a soft magnetic thin film for forming a loop magnetic circuit; and a magnetic gap formed in a part of the loop magnetic circuit. In this case, the entire or partial soft magnetic thin film of the magnetic core is represented by a composition formula of $Fe_{a3} \cdot Co_{b3} \cdot M3_{c3} \cdot O_{d3}$, the M3 is at least one selected from the group consisting of Ti, V, Ta, Nb, Cr, Mo and W, and atomic % values of the a3 to d3 respectively satisfy the following:

$51.0 \leq a3 \leq 95.0$, $5.0 \leq b3 \leq 49.0$, $0.5 \leq c3 \leq 15.0$, $0.5 \leq d3 \leq 20.0$, $a3+b3+c3+d3=100$

DETAILED DESCRIPTION OF THE PREFERRED EMBODIMENTS

Next, detailed description will be made of the specific embodiments of the present invention.

(1) First Group of the Invention

A soft magnetic thin film of the present invention is designed to have a composition for a thin film magnetic head. This soft magnetic thin film is represented by a composition formula of $Fe_{a1} \cdot Co_{b1} \cdot C_{c1} \cdot O_{d1}$.

In the composition formula, C denotes carbon, and O denotes oxygen.

In the composition formula, a1 to d1 denote atomic % (at %) of each of chemical elements, and atomic % values of the a1 to d1 are respectively set in the following ranges:

$51.0 \leq a1 \leq 95.0$, $5.0 \leq b1 \leq 49.0$ $0.5 \leq c10.0$ $0.5 \leq d1 \leq 20.0$ $a1+b1+c1+d1=100$ When a value of a1 is set to exceed 95.0 or set to be less than 51.0, inconvenience of a reduction in a saturation magnetic flux Bs tends to occur. A preferable range of the a1 value is $60.0 \leq a1 \leq 80.0$.

When a value of b1 is set to exceed 49.0 or set to be less than 5.0, inconvenience of a reduction in a saturation magnetic flux Bs tends to occur. A preferable range of the b1 value is $20.0 \leq b1 \leq 40.0$.

When a value of c1 is set to exceed 10.0, inconveniences of a reduction in a saturation magnetic flux density Bs and a loss of proper uniaxial anisotropy tend to simultaneously occur. Also, when a value of c1 is set to be less than 0.5, inconvenience of increases in an anisotropic magnetic field and a coercive force Hc tends to occur.

When a value of d1 is set to exceed 20.0, inconveniences of a reduction in a saturation magnetic flux density Bs and an increase in an anisotropic magnetic field tend to occur. Also, when a value of d1 is set to be less than 0.5, inconvenience of an increase in a coercive force Hc tends to occur.

Preferable ranges of the c1 value and the d1 value are respectively $0.5 \leq c1 \leq 5.0$, and $0.5 \leq d1 \leq 13.0$.

According to the present invention, combined addition of carbon and oxygen enables a coercive force to be reduced without any particular large reductions in a saturation magnetic flux density of the film. Moreover, it is possible to control film stress by properly adjusting an added amount of carbon according to concentration of oxygen. Thus, an anisotropic magnetic field induced by distortion can be controlled (an increase in an anisotropic magnetic field can be suppressed, and a reduction in permeability can be prevented).

For production of a thin film of the present invention, a thin film forming device such as spurring or deposition is used. As a sputtering device, for example, an RF 2-pole sputter, a DC sputter, a magnetron sputter, a 3-pole sputter, an ion beam sputter, or an opposite target sputter can be used. According to the present invention, for a method of containing oxygen and carbon in the film, a preferable example is a reactive sputter for performing sputtering in mixed gas atmosphere mixing $O_2$ and $CO_2$ gas in inert gas such as Ar.

In addition, a film may be deposited by sputtering, using a composite target obtained by combining a plurality of targets containing predetermined elements.

Figure 1:
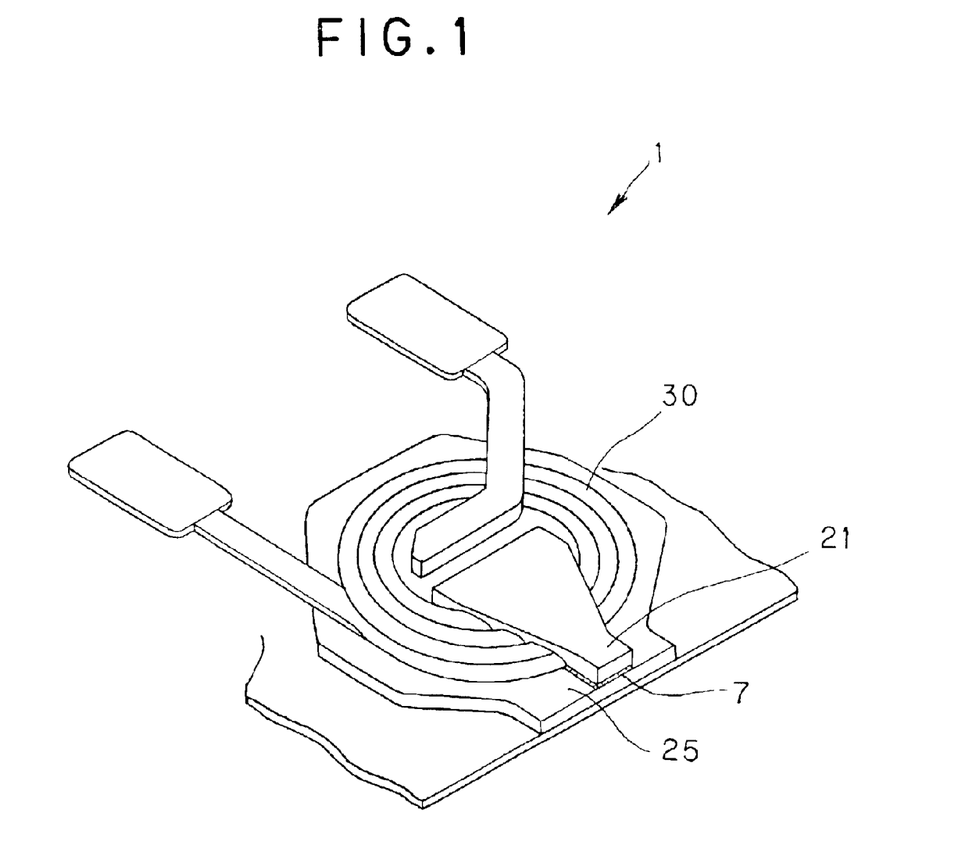
FIG. 1 is a schematic perspective view conceptually showing only main portions of a thin film magnetic head according to the present invention.

The thin fill (soft magnetic thin film) of the present invention thus formed is used for a thin film magnetic head 1 schematically shown in FIG. 1. That is, the thin film magnetic head 1 of the present invention comprises magnetic cores 21 and 25 made of soft magnetic thin films for constituting a loop magnetic circuit, and a magnetic gap 7 formed in a part of the loop magnetic circuit. The entire or partial soft magnetic film of each of the magnetic cores 21 and 25 has the above-described composition of the present invention.

The thin film magnetic head 1 may be constructed as a composite head by being united with a so-called read only MR head.

A reason for the above-described composition requirement of the thin film magnetic head, "all or a part constituting the magnetic core", is as follows. Normally, the magnetic cores 21 and 25 are formed by combining upper and lower magnetic thin films 21 and 25 in a form of sandwiching a thin film coil 30. However, it is only necessary for either one of the upper and lower magnetic thin films 21 and 25 to satisfy at least the thin film composition of the present invention. Generally, it is preferred that the upper and lower thin films 21 and 25 both satisfy the thin film composition of the present invention.

Hereinafter, more detailed description is made of the present invention by way of specific embodiment.

[Embodiment I]

A magnetic thin film (soft magnetic thin film) having a composition shown below in Table 1 was formed on a glass substrate in the following manner.

That is, targets of Fe, FeCo, and FeCoC were used as target materials for forming a magnetic thin film, and a soft magnetic thin film was deposited on the glass substrate by a DC magnetron sputtering device (Type 7960FL made by Aneruba Inc.). Mixed gas of Ar, Ar+$O_2$, and Ar+$CO_2$ was used as sputtering gas, a gas pressure in deposition was set to 0.2 PA to 0.8 Pa, and a power input was set to 200 to 2000 W. A deposition rate was set in a range of 5 to 100 nm/min.

For each obtained thin film sample, (1) a saturation magnetic flux density (measured by VSM), (2) a coercive force (measured by B-H tracer), (3) an anisotropic magnetic field (measured by B-H tracer), and (4) specific resistance (measured by four-end needle method) were respectively measured.

Table 1 shows an evaluation result of each of the above-described measurements.

(2) Second Group of the Invention

A soft magnetic thin film of the present invention is designed to have a composition for a thin film magnetic head. This soft magnetic thin film is represented by a composition formula of $Fe_{a2} \cdot Co_{b2} \cdot M2_{c2} \cdot C_{d2} \cdot O_{a2}$.

In the composition formula, M2 denotes one or more selected from the group consisting of Ti, V, Ta, Nb, Cr, Mo, W, Cu, Zn, Ga, Al, Zr, Y, Si, and B. In the present invention, the use of one or more of the above-described elements for M2 enables a crystal grin to be made fine only by addition of a small amount. Thus, it is possible to reduce a coercive force, and obtain a desired value of specific resistance while maintaining a value of a saturation magnetic flux at a high level.

Zr, Ti, Ta, Nb and Cr are especially preferable among the above-described elements of M2.

In the composition formula, a2 to e2 denote atomic % (at %) of each of chemical elements, and atomic % values of the a2 to d2 are respectively set in the following ranges:

$51.0 \leq a2 \leq 95.0$, $5.0 \leq b2 \leq 49.0$,

TABLE 1

| | Magnetic thin film composition (at %) | Saturation magnetic flux density Bs(T) | Coercive force Hc (A/m) | Anisotropic magnetic field (A/m) | Specific resistance ($\mu\Omega \cdot$ cm) | Heat treatment |
|---|---|---|---|---|---|---|
| Embodiment I-1 | Fe(65.4)-Co(24.6)-C(2.8)-O(7.2) | 2.22 | 395 | 1027 | 72.0 | None |
| Embodiment I-2 | Fe(65.4)-Co(24.6)-C(2.8)-O(7.2) | 2.24 | 198 | 1114 | 69.5 | 250° C. |
| Embodiment I-3 | Fe(68.4)-Co(26.9)-C(1.4)-O(3.3) | 2.31 | 371 | 648 | 32.4 | None |
| Embodiment I-4 | Fe(68.4)-Co(26.9)-C(1.4)-O(3.3) | 2.33 | 324 | 766 | 29.8 | 250° C. |
| Embodiment I-5 | Fe(67.1)-Co(31.0)-C(0.7)-O(1.2) | 2.40 | 390 | 1600 | 27.0 | 250° C. |
| Embodiment I-6 | Fe(68.1)-Co(17.4)-C(2.0)-O(12.5) | 2.05 | 80 | 1760 | 92.0 | 25° C. |
| Comparative example I-1 | Fe(69.8)-Co(30.2) | 2.39 | 7703 | 182 | 18.3 | None |
| Comparative example I-2 | Fe(69.8)-Co(30.2) | 2.42 | 5293 | 2259 | 15.2 | 250° C. |
| Comparative example I-3 | Fe(65.9)-Co(28.8)-O(5.3) | 2.21 | 1785 | 1161 | 29.9 | None |
| Comparative example I-4 | Fe(65.9)-Co(28.8)-O(5.3) | 2.25 | 1406 | 1256 | 15.2 | 250° C. |

The result clearly shows the advantage of the present invention. That is, the soft magnetic thin film of the present invention is represented by the composition formula of $Fe_{a1} \cdot Co_{b1} \cdot C_{c1} \cdot O_{d1}$, and the atomic % values of the a1 to d1 respectively satisfy the following:

$51.0 \leq a1 \leq 95.0$, $5.0 \leq b1 \leq 49.0$ $0.5 \leq c1 \leq 10.0$ $0.5 \leq d1 \leq 20.0$ $a1+b1+c1+d1=100$ Thus, it is possible to provide a thin film magnetic film capable of improving a characteristic of a thin film magnetic head by achieving a high saturation magnetic flux density, suppressing an increase in an anisotropic magnetic field caused by increased concentration of oxygen, reducing a coercive force, and preventing a reduction in permeability.

$0.5 \leq c2 \leq 15.0$, $0.5 \leq d2 \leq 10.0$, $0.5 \leq e2 \leq 20.0$, $a+2b+2+c2+d2+e2=100$ When a value of a2 is set to exceed 95.0 or set to be less than 51.0, inconvenience of a reduction in a saturation magnetic flux Bs tends to occur. A preferable range of the a2 value is $60.0 \leq a2 \leq 80.0$.

When a value of b2 is set to exceed 49.0 or set to be less than 5.0, inconvenience of a reduction in a saturation magnetic flux Bs tends to occur. A preferable range of the b2 value is $10.0 \leq b2 \leq 35.0$.

When a value of c2 is set to exceed 15.0, inconvenience of a reduction in a saturation magnetic flux density Bs tends to occur because a crystal grain is made fine excessively. Also, when a value of c2 is set to be less than 0.5, inconvenience of an increase in a coercive force Hc tends to occur because a crystal grain of the film is not made fine. A preferable range of the c2 value is $0.5 \leq c2 \leq 8.0$.

When a value of d2 is set to exceed 10.0, inconveniences of a reduction in a saturation magnetic flux density Bs and a loss of proper uniaxial anisotropy caused by a excessive small anisotropic magnetic field tend to occur. Also, when a value of d2 is set to be less than 0.5, inconvenience of an increase in an anisotropic field tends to occur. A preferable range of the d2 value is $0.55 \leq d2 \leq 7.0$.

When a value of e2 is set to exceed 20.0, inconveniences of a reduction in a saturation magnetic field density Bs and an increase in an anisotropic magnetic field tend to occur. Also, when a value of e2 is set to be less than 0.5, inconvenience of an increase in a coercive force Hc tends to occur. A preferable range of the e2 value is $0.5 \leq e2 \leq 18.0$.

According to the present invention, combined addition of carbon and oxygen enables a coercive force to be reduced without any particular large reductions in a saturation magnetic flux density of the film. Moreover, it is possible to control film stress by properly adjusting an added amount of carbon according to concentration of oxygen. Thus, an anisotropic magnetic field induced by distortion can be controlled (an increase in an anisotropic magnetic field can be suppressed, and a reduction in permeability can be prevented).

For production of a thin film of the present invention, a thin film forming device such as spurring or deposition is used. As a sputtering device, for example, an RF 2-pole sputter, a DC sputter, a magnetron sputter, a 3-pole sputter, an ion beam sputter, or an opposite target sputter can be used. According to the present invention, for a method of containing oxygen and carbon in the film, a preferable example is a reactive sputter for performing sputtering in mixed gas atmosphere mixing $O_2$ and $CO_2$ gas in inert gas such as Ar.

In addition, a film may be deposited by sputtering, using a composite target obtained by disposing an Fe or M2 oxide on an alloy target containing a predetermined element (e.g., Fe, FeCo, FeCoM2, or FeCoM2C).

The thin fill (soft magnetic thin film) of the present invention thus formed is used for a thin film magnetic head 1 schematically shown in FIG. 1. That is, the thin film magnetic head 1 of the present invention comprises magnetic cores 21 and 25 made of soft magnetic thin films for constituting a loop magnetic circuit, and a magnetic gap 7 formed in a part of the loop magnetic circuit. The entire or partial soft magnetic film of each of the magnetic cores 21 and 25 has the above-described composition of the present invention.

The thin film magnetic head 1 may be constructed as a composite head by being united with a so-called read only MR head.

A reason for the above-described composition requirement of the thin film magnetic head, "all or a part constituting the magnetic core", is as follows. Normally, the magnetic cores 21 and 25 are formed by combining upper and lower magnetic thin films 21 and 25 in a form of sandwiching a thin film coil 30. However, it is only necessary for either one of the upper and lower magnetic thin films 21 and 25 to satisfy at least the thin film composition of the present invention. Generally, it is preferred that the upper and lower thin films 21 and 25 both satisfy the thin film composition of the present invention.

Hereinafter, more detailed description is made of the present invention by way of specific embodiment.

[Embodiment II]

A magnetic thin film (soft magnetic thin film) having a composition shown below in Table 2 was formed on a glass substrate in the following manner.

That is, targets of Fe, FeCo, FeCoM2, and FeCoM2C (M2 is optionally set as shown in Table 2) were used as target materials for forming a magnetic thin film, and a soft magnetic thin film was deposited on the glass substrate by a DC magnetron sputtering device (Type 7960FL made by Aneruba Inc.). Mixed gas of Ar, Ar+$O_2$, and Ar+$CO_2$ was used as sputtering gas, a gas pressure in deposition was set to 0.2 PA to 0.8 Pa, and a power input was set to 200 to 2000 W. A deposition rate was set in a range of 5 to 100 nm/min.

For each obtained thin film sample, (1) a saturation magnetic flux density (measured by VSM), (2) a coercive force (measured by B-H tracer), (3) specific resistance (measured by four-end needle method), and (4) an anisotropic magnetic field (measured by B-H tracer) were respectively measured.

Table 2 shows an evaluation result of each of the above-described measurements.

TABLE 2

| | Magnetic thin film composition (at %) | Saturation magnetic flux density Bs(T) | Coercive force Hc (A/m) | Anisotropic magnetic field (A/m) | Specific resistance ($\mu\Omega \cdot cm$) | Heat treatment |
|---|---|---|---|---|---|---|
| Embodiment II-1 | Fe(68.3)-Co(17.0)-Zr(2.1)-C(3.7)-O(8.9) | 2.07 | 150 | 1683 | 79.1 | None |
| Embodiment II-2 | Fe(68.3)-CO(17.0)-Zr(2.1)-C(3.7)-O(8.9) | 2.09 | 32 | 1643 | 75.7 | 250° C. |
| Embodiment II-3 | Fe(67.4)-Co(16.9)-Zr(2.4)-C(3.8)-O(9.5) | 2.04 | 213 | 719 | 80.4 | None |
| Embodiment II-4 | Fe(67.4)-CO(16.9)-Zr(2.4)-C(3.8)-O(9.5) | 2.04 | 111 | 1248 | 76.5 | 250° C. |
| Embodiment II-5 | Fe(64.8)-CO(16.2)-Zr(2.1)-C(4.7)-O(12.2) | 1.92 | 71 | 1920 | 103.8 | None |
| Embodiment II-6 | Fe(64.8)-CO(16.2)-Zr(2.1)-C(4.7)-O(12.2) | 1.95 | 8 | 1161 | 90.3 | 250° C. |
| Embodiment II-7 | Fe(68.4)-Co(26.9)-Zr(1.2)-C(0.9)-O(3.2) | 2.22 | 300 | 806 | 39.2 | None |
| Embodiment II-8 | Fe(68.4)-Co(26.9)-Zr(1.2)-C(0.9)-O(3.2) | 2.25 | 261 | 916 | 35.8 | 250° C. |

TABLE 2-continued

| | Magnetic thin film composition (at %) | Saturation magnetic flux density Bs(T) | Coercive force Hc (A/m) | Anisotropic magnetic field (A/m) | Specific resistance ($\mu\Omega \cdot$ cm) | Heat treatment |
|---|---|---|---|---|---|---|
| Embodiment II-9 | Fe(67.1)-Co(26.3)-Ta(1.8)-C(1.5)-O(3.3) | 2.23 | 240 | 870 | 37.0 | 250° C. |
| Embodiment II-10 | Fe(66.3)-Co(25.8)-Ta(2.9)-C(1.5)-O(3.5) | 2.20 | 230 | 1240 | 39.8 | 250° C. |
| Embodiment II-11 | Fe(62.8)-Co(21.7)-Ta(4.5)-C(3.4)-O(7.6) | 2.08 | 90 | 1560 | 76.4 | 250° C. |
| Embodiment II-12 | Fe(67.3)-Co(27.2)-Ti(1.6)-C(0.9)-O(3.0) | 2.27 | 270 | 945 | 31.2 | 250° C. |
| Embodiment II-13 | Fe(63.5)-Co(25.4)-Ti(3.1)-C(3.2)-O(4.8) | 2.15 | 144 | 1480 | 64.5 | 250° C. |
| Embodiment II-14 | Fe(62.0)-Co(19.8)-Ti(5.4)-O(4.0)-O(8.8) | 2.00 | 78 | 2080 | 91.5 | 250° C. |
| Comparative example II-1 | Fe(69.8)-Co(30.2) | 2.39 | 7703 | 182 | 18.3 | None |
| Comparative example II-2 | Fe(69.8)-Co(30.2) | 2.42 | 5293 | 2259 | 15.2 | 250° C. |
| Comparative example II-3 | Fe(65.9)-Co(28.8)-O(5.3) | 2.21 | 1785 | 1161 | 29.9 | None |
| Comparative example II-4 | Fe(65.9)-Co(28.8)-O(53) | 2.25 | 1406 | 1256 | 15.2 | 250° C. |
| Comparative example II-5 | Fe(55.1)-Co(12.5)-Zr(1.9)-C(16.2)-O(14.3) | 1.57 | 2072 | 112 | 131.4 | 250° C. |
| Comparative example II-6 | Fe(68.0)-Co(17.2)-Zr(2.2)-C(0.07)-O(12.6) | 1.94 | 72 | >8000 | 105.7 | 250° C. |
| Comparative example II-7 | Fe(56.2)-Co(15.1)-Zr(2.0)-C(3.2)-O(23.5) | 1.30 | >8000 | >8000 | 270.7 | 250° C. |
| Comparative example II-8 | Fe(69.1)-Co(27.4)-Zr(1.8)-C(1.5)-O(0.2) | 2.32 | 4560 | 848 | 50.4 | 250° C. |

It was verified that use of the elements of the present invention other than M2 element shown in Table 2 provided advantages roughly similar to those of the embodiment samples of Table 2.

The result clearly shows the advantage of the present invention. That is, the soft magnetic thin film of the present invention is represented by the composition formula of $Fe_{a2} \cdot Co_{b2} \cdot M2_{c2} \cdot C_{d2} \cdot O_{e2}$, M2 is at least one selected from the group consisting of Ti, V, Ta, Nb, Cr, Mo, W, Cu, Zn, Ga, Al, Zr, Y, Si and B, and the atomic % values of the a2 to e2 respectively satisfy the following:

$51.0 \leq a2 \leq 95.0$, $5.0 \leq b2 \leq 49.0$, $0.5 \leq c2 \leq 150.0$, $0.5 \leq d2 \leq 10.0$, $0.5 \leq e2 \leq 20.0$, $a2+b2+c2+d2+e2=100$ Thus, it is possible to provide a thin film magnetic film capable of improving a characteristic of a thin film magnetic head by achieving a high saturation magnetic flux density and a small coercive force, suppressing an increase in an anisotropic magnetic field caused by increased concentration of oxygen, and preventing a reduction in permeability.

(3) Third Group of the Invention

A soft magnetic thin film of the present invention is designed to have a composition for a thin film magnetic head. This soft magnetic thin film is represented by a composition formula of $Fe_{a3} \cdot Co_{b3} \cdot M3_{c3} \cdot O_{d3}$.

In the composition formula, M3 denotes one or more selected from the group consisting of Ti, V, Ta, Nb, Cr, Mo and WC. According to the present invention, the use of the above-described elements for M3 enables a desired value of specific resistance to be obtained while a value of a saturation magnetic flux is maintained at a high level. This will become more apparent upon reference to an experiment example of a later-described embodiment. Ta and Ti are especially preferable among the element of M3.

In the composition formula, a3 to d3 denote atomic % (at %) of each of chemical elements, and atomic % values of the a3 to d3 are respectively set in the following ranges:

$51.0 \leq a3 \leq 95.0$, $5.0 \leq b3 \leq 49.0$, $0.5 \leq c3 \leq 15.0$, $0.5 \leq d3 \leq 20.0$, $a3+b3+c3+d3=100$ When a value of a3 is set to exceed 95.0 or set to be less than 51.0, inconvenience of a reduction in a saturation magnetic flux Bs tends to occur. A preferable range of the a3 value is $62.0 \leq a3 \leq 82.0$.

When a value of b3 is set to exceed 49.0 or set to be less than 5.0, inconvenience of a reduction in a saturation magnetic flux Bs tends to occur. A preferable range of the b3 value is $12.0 \leq b3 \leq 33.0$.

When a value of c3 is set to exceed 15.0, inconvenience of a reduction in a saturation magnetic flux density Bs tends to occur because the film approaches an amorphous state. Also, when a value of c3 is set to be less than 0.5, inconvenience of an increase in a coercive force Hc tends to occur because of a large crystal grain of the film.

When a value of d3 is set to exceed 20.0, inconveniences of a reduction in a saturation magnetic flux density Bs and an increase in an anisotropic magnetic field tend to occur. Also, when a value of d3 is set to be less than 0.5, inconveniences of an increase in a coercive force Hc and a reduction in a coercive force Hc tend to occur because of insufficient fine crystallization of the film.

Preferable combination ranges of the c3 value and the d3 value are generally classified as the following two:

(i) Combination of $0.5 \leq c3 \leq 2.0$, and $0.5 \leq d3 \leq 8.0$.

In this case, a very high value of a saturation magnetic flux density is obtained, while a value of specific resistance is slightly lowered. However, as descried above, a balanced level between the value of a saturation magnetic flux density and the value of specific resistance is high, which is never observed in the conventional art. Thus, the combination is a suitable range for thin film designing when a very high value of a saturation magnetic flux density is to be obtained even while a value of specific resistance is slightly low.

A second preferable combination is the following:

(ii) Combination of $2.1 \leq c3 \leq 4.0$, and $9.0 \leq d3 \leq 18.0$

In this case, a value of a saturation magnetic flux is not very high, but normal. Instead, a value of specific resistance is extremely high. However, as described above, a balanced level between the value of a saturation magnetic flux and the value of specific value is high, which is never observed in the conventional example. Thus, the combination is a suitable range for thin film designing when a normal level of a saturation magnetic flux density is to be obtained while an extremely high value of specific resistance is obtained.

For production of a thin film of the present invention, a thin film forming device such as spurring or deposition is used. As a sputtering device, for example, an RF 2-pole sputter, a DC sputter, a magnetron sputter, a 3-pole sputter, an ion beam sputter, or an opposite target sputter can be used. According to the present invention, for a method of containing oxygen in the film, a preferable example is a reactive sputter for performing sputtering in mixed gas atmosphere mixing $O_2$ gas in inert gas such as Ar. In addition, a film may be deposited by sputtering, using a composite target obtained by disposing Fe or M3 oxide on an alloy target containing a predetermined element (e.g., Fe, FeCo, or FeCoM3).

The thin fill (soft magnetic thin film) of the present invention thus formed is used for a thin film magnetic head 1 schematically shown in FIG. 1. That is, the thin film magnetic head 1 of the present invention comprises magnetic cores 21 and 25 made of soft magnetic thin films for constituting a loop magnetic circuit, and a magnetic gap 7 formed in a part of the loop magnetic circuit. The entire or partial soft magnetic film of each of the magnetic cores 21 and 25 has the above-described composition of the present invention.

The thin film magnetic head 1 may be constructed as a composite head by being united with a so-called read only MR head.

A reason for the above-described composition requirement of the thin film magnetic head, "all or a part constituting the magnetic core", is as follows. Normally, the magnetic cores 21 and 25 are formed by combining upper and lower magnetic thin films 21 and 25 in a form of sandwiching a thin film coil 30. However, it is only necessary for either one of the upper and lower magnetic thin films 21 and 25 to satisfy at least the thin film composition of the present invention. Generally, it is preferred that the upper and lower thin films 21 and 25 both satisfy the thin film composition of the present invention.

Hereinafter, more detailed description is made of the present invention by way of specific embodiment.

[Embodiment III-1]

A magnetic thin film (soft magnetic thin film) having a composition shown below in Table 3 was formed on a glass substrate in the following manner.

That is, targets of Fe, FeCo, and FeCoM3 (M3 is optionally selected as shown in Table 3) were used as target materials for forming a magnetic thin film, and a soft magnetic thin film was deposited on the glass substrate by a DC magnetron sputtering device (Type 7960FL made by Aneruba Inc.). Mixed gas of $Ar+O_2$ was used as sputtering gas, a gas pressure in deposition was set to 0.2 PA to 0.8 Pa, and a power input was set to 200 to 2000 W. A deposition rate was set in a range of 5 to 100 nm/min.

For each obtained thin film sample, (1) a saturation magnetic flux density (measured by VSM), (2) a coercive force (measured by B-H tracer), (3) specific resistance (measured by four-end needle method) were respectively measured.

Table 3 shows an evaluation result of each of the above-described measurements.

TABLE 3

|  | Magnetic thin film composition (at %) | Saturation magnetic flux density(T) | Specific resistance ($\mu\Omega \cdot cm$) | Coercive force Hc (A/m) | Heat treatment |
| --- | --- | --- | --- | --- | --- |
| Embodiment III-1 | Fe(67.2)-Co(26.5)-Ta(1.8)-O(4.5) | 2.21 | 47.1 | 253 | None |
| Embodiment III-2 | Fe(67.2)-Co(26.5)-Ta(1.8)-O(4.5) | 2.23 | 40.4 | 213 | 250° C. |
| Embodiment III-3 | Fe(68.4)-Co(26.2)-Ta(1.5)-O(3.9) | 2.29 | 37.5 | 269 | 250° C. |
| Embodiment III-4 | Fe(71.0)-Co(24.8)-Ta(2.0)-O(2.2) | 2.31 | 33.2 | 371 | 250° C. |
| Embodiment III-5 | Fe(68.9)-Co(17.8)-Ta(2.7)-O(10.6) | 2.02 | 121 | 198 | None |

TABLE 3-continued

|  | Magnetic thin film composition (at %) | Saturation magnetic flux density(T) | Specific resistance ($\mu\Omega \cdot$ cm) | Coercive force Hc (A/m) | Heat treatment |
|---|---|---|---|---|---|
| Embodiment III-6 | Fe(68.9)-Co(17.8)-Ta(2.7)-O(10.6) | 2.05 | 114.1 | 134 | 250° C. |
| Embodiment III-7 | Fe(67.7)-Co(16.9)-Ta(3.1)-O(12.3) | 2.00 | 138.7 | 119 | 250° C. |
| Embodiment III-8 | Fe(68.9)-Co(17.3)-Ti(2.4)-O(11.4) | 1.98 | 93.7 | 119 | 250° C. |
| Embodiment III-9 | Fe(66.6)-Co(16.7)-Ti(2.6)-O(14.1) | 1.94 | 110.4 | 198 | 250° C. |
| Comparative example III-1 | Fe(69.8)-Co(30.2) | 2.42 | 15.2 | 5293 | 250° C. |

It was verified that use of the elements of the present invention other than Ta and Ti of Table 3 provided advantages (slightly smaller) roughly similar to those of the embodiment samples of Table 3.

[Embodiment III-2]

In order to clarify the advantages of the present invention in comparison with the conventional example, comparative examples III-2 to III-5 were further prepared as shown in Table 4, and a experiment was made to compare embodiment samples III-2 and III-6 with these comparative examples. Results are as follows:

(1) As a sample opposite the embodiment III-2 sample (Table 3), a comparative example sample III-2 of Fe—Co—Hf—O having the same value (2.23T) of a saturation magnetic flux density was prepared. It was verified that a value of specific resistance of the comparative example sample III-2 was lower by about 12% compared with that (40.4$\mu$m$\Omega\cdot$cm) of the embodiment III-2 sample, while values of saturation magnetic flux densities Bs of both samples were equal to each other.

(2) As a sample opposite the embodiment III-2 sample (Table 3), a comparative example sample III-3 of Fe—Co—Hf—O having the same value (40.4$\mu$m$\Omega\cdot$cm) of specific resistance was prepared. It was verified that a value of a saturation magnetic flux density of the comparative example sample III-3 was lower by about 3.6% compared with that (2.23T) of the embodiment III-2 sample, while values of specific resistance of both samples were equal to each other.

(3) As a sample opposite the embodiment III-6 sample (Table 3), a comparative example sample III-4 of Fe—Co—Hf—O having the same value (2.05 T) of a-saturation magnetic flux density was prepared. It was verified that a value of specific resistance of the comparative example sample III-4 was lower by about 14% compared with that (114.1 $\mu$m$\Omega\cdot$cm) of the embodiment III-6 sample, while values of saturation magnetic flux densities Bs of both samples were equal to each other.

(4) As a sample opposite the embodiment III-6 sample (Table 3), a comparative sample III-5 of Fe—Co—Hf—O having the same value (114.1 $\mu$m$\Omega\cdot$cm) of specified resistance was prepared. It was verified that a value of a saturation magnetic flux density of the comparative example sample III-5 was lower by about 5.9% compared with that (2.05T) of the embodiment III-6 sample, while values of specific resistance of both samples were equal to each other.

TABLE 4

|  | Magnetic thin film composition (at %) | Saturation magnetic flux density(T) | Specific resistance ($\mu\Omega \cdot$ cm) | Coercive force Hc (A/m) | Heat treatment |
|---|---|---|---|---|---|
| Embodiment III-2 | Fe(67.2)-Co(26.5)-Ta(1.8)-O(4.5) | 2.23 | 40.4 | 213 | 250° C. |
| Comparative example III-2 | Fe(67.4)-Co(26.8)-Hf(1.8)-O(4.0) | 2.23 | 35.4 | 290 | 250° C. |
| Comparative example III-3 | Fe(67.0)-Co(26.5)-Hf(1.8)-O(4.7) | 2.15 | 40.4 | 200 | 250° C. |
| Embodiment III-6 | Fe(68.9)-Co(17.8)-Ta(2.7)-O(10.6) | 2.05 | 114.1 | 134 | 250° C. |
| Comparative example III-4 | Fe(71.3)-Co(17.1)-Hf(2.7)-O(8.9) | 2.05 | 98.0 | 197 | 250° C. |
| Comparative example III-5 | Fe(69.0)-Co(18.3)-Hf(2.7)-O(10.0) | 1.93 | 114.1 | 112 | 250° C. |

The result clearly shows the advantage of the present invention. That is, the soft magnetic thin film of the present invention is represented by a composition formula of $Fe_{a3} \cdot Co_{b3} \cdot M3_{c3} \cdot O_{d3}$, M3 is at least one selected from the group consisting of Ti, V, Ta, Nb, Cr, Mo and W, and atomic % values of the a3 to d3 respectively satisfy the following:

$51.0 \leq a3 \leq 95.0$, $5.0 \leq b3 \leq 49.0$, $0.5 \leq c3 \leq 15.0$, $0.5 \leq d3 \leq 20.0$, $a3+b3+c3+d3=100$ Thus, the present invention is very advantageous in that values of a saturation magnetic flux density and specific resistance can be set at high levels in a well-balanced manner.

What is claimed is:

1. A soft magnetic thin film represented by a composition formula of $Fe_{a3} \cdot Co_{b3} \cdot M3_{c3} \cdot O_{d3}$, wherein M3 is at least one selected from the group consisting of Ti, V, Ta, Nb, Cr, Mo and W, and atomic % values of a3 to d3 respectively satisfy the following:

$51.0 \leq a3 \leq 95.0$, $5.0 \leq b3 \leq 49.0$, $2.1 \leq c3 \leq 4.0$ $9.0 \leq d3 \leq 18.0$, and $a3+b3+c3+d3=100$, and wherein the soft magnetic thin film has a saturation magnetic flux density of from 1.94 to 2.05 (T), a specific resistance of from 138.7 to 93.7 $\mu\Omega \cdot cm$ and a coercive force of from 119 to 198 A/m.

2. The soft magnetic thin film according to claim 1, wherein M3 is at least one selected from the group consisting of Ta and Ti.

3. The soft magnetic thin film of claim 1, wherein $62.0 \leq a3 \leq 82.0$, and $12.0 \leq b3 \leq 33.0$.

4. A thin film magnetic head comprising:

a magnetic core made of a soft magnetic thin film for forming a loop magnetic circuit; and a magnetic gap formed in a part of the loop magnetic circuit, wherein the entire or partial soft magnetic thin film of the magnetic core is represented by a composition formula of $Fe_{a3} \cdot Co_{b3} \cdot M3_{c3} \cdot O_{d3}$, M3 is at least one selected from the group consisting of Ti, V, Ta, Nb, Cr, Mo and W, and atomic % values of a3 to d3 respectively satisfy the following:

$51.0 \leq a3 \leq 95.0$, $5.0 \leq b3 \leq 49.0$, $2.1 \leq c3 \leq 4.0$ $9.0 \leq d3 \leq 18.0$, $a3+b3+c3+d3=100$, and wherein the soft magnetic thin film has a saturation magnetic flux density of from 1.94 to 2.05 (T), a specific resistance of from 138.7 to 93.7 $\mu\Omega \cdot cm$ and a coercive force of from 119 to 198 A/m.

5. The thin film magnetic head according to claim 4, wherein M3 is at least one selected from the group consisting of Ta and Ti.

6. The soft magnetic thin film of claim 4, wherein $62.0 \leq a3 \leq 82.0$, and $12.0 \leq b3 \leq 33.0$.

* * * * *